US005361938A

United States Patent [19]

Ishine

[11] Patent Number: 5,361,938

[45] Date of Patent: Nov. 8, 1994

[54] AUTOMATIC VENDING APPARATUS ADAPTABLE TO ACCOMMODATE DIFFERENT-SIZED COMMODITY

[75] Inventor: Seizo Ishine, Kanagawa, Japan

[73] Assignee: Kabushiki Kaisha Toshiba, Kawasaki, Japan

[21] Appl. No.: 170,749

[22] Filed: Dec. 21, 1993

[30] Foreign Application Priority Data

Dec. 21, 1992 [JP] Japan .................................. 4-340095
May 12, 1993 [JP] Japan .................................. 5-110712

[51] Int. Cl.[5] .............................................. B65G 59/06

[52] U.S. Cl. .................................... 221/289; 221/298; 221/241; 221/193; 221/150 R

[58] Field of Search ........................ 312/36, 45, 72, 73; 221/289, 298, 299, 300, 301, 241, 191, 193, 194, 195, 150 R, 304

[56] References Cited

U.S. PATENT DOCUMENTS 4,423,828 1/1984 Tanaka et al. .................. 221/298 X

FOREIGN PATENT DOCUMENTS 60-29436 7/1985 Japan .
1226094 9/1989 Japan .............................. 221/289 X
4177594 6/1992 Japan .............................. 221/241 X
4199295 7/1992 Japan .............................. 221/298 X
5-89337 4/1993 Japan .
589348 4/1993 Japan .............................. 221/193 X

*Primary Examiner*—Robert P. Olszewski
*Assistant Examiner*—Dean A. Reichard
*Attorney, Agent, or Firm*—Foley & Lardner

[57] ABSTRACT

A commodity delivering device for automatic vending machines in which both thick commodities and thin commodities are sorted out automatically without manually adjusting the commodity passage width. The automatic vending apparatus includes: a commodity feed mechanism in which the commodity mechnism is equipped with: first stopper for freely switching between an activation position and a no-activation position, the activation position thereof being projected into a commodity passage so as to support the thick commodity and the no-activation position being retreated from the commodity passage; second stopper, disposed right under the first stopper, for freely switching between an activation position and a no-activation position; and feed stopper for switching between an activation position interlocked with the first or second stopper so as to thereon support the commodity, and a feed position for transferring the commodity downward.

4 Claims, 16 Drawing Sheets

AUTOMATIC VENDING APPARATUS ADAPTABLE TO ACCOMMODATE DIFFERENT-SIZED COMMODITY

BACKGROUND OF THE INVENTION

1. Technical Field

The present invention relates to an automatic vending machine for vending canned commodities whose sizes vary, where particularly two different sizes are present.

2. Background Art

Referring to FIG. 1 which shows configuration for a commodity delivering apparatus, a pair of commodity support stoppers 107, 109 are provided for supporting commodities disposed within a first commodity passage 105 (left) and a second commodity passage 105 (right). When the lowest-level commodity supported by the stopper 109 is dropped, tile upper-level commodity stopper 107 operates to support temporarily a next commodity which will be fed on to commodity stopper 109. Accordingly, the upper-level commodity stopper 107 and the lower-level commodity stopper 109 are alternately projected so that the commodity is delivered one by one.

As described before, the commodities are delivered one by one by the vending machine. However, for example there 0exist commodities whose radius is greater than other canned commodities. In other words, when there are big commodities whose radii are greater than other small commodities whose radii are smaller than the big commodities, guide plates 111, 111 (see FIG. 1) are operated so that passage width for the big and small commodities are controlled and adjusted responsive to the sizes of cans in question.

However, it is difficult to precisely and properly set the left and right guides plates 111, 111 to a shifting degree responsive to big and small commodities. Moreover, since the passage width is adjusted manually one by one, operation for adjusting the passage width is very time-consuming and troublesome.

SUMMARY OF THE INVENTION

In view of the foregoing drawbacks, it is therefore an object of the present invention to provide a commodity delivering device for the automatic vending machines in which both the big-sized (thick) commodities and the small-sized (thin) commodities are sorted out automatically without manually adjusting the commodity passage width.

To achieve the object, there is provided an automatic vending apparatus for use with two different-size commodities in which a commodity feed mechanism thereof comprises: first stopper means for freely switching between an activation position and a no-activation position, the activation position thereof being projected into a commodity passage so as to support a thick commodity and the no-activation position being retreated from the commodity passage; second stopper means, disposed right under the first stopper means, for freely switching between an activation position and a no-activation position; and feed stopper means for switching between an activation position interlocked with the first or second stopper means so as to thereon support the commodity, and a feed position for transferring the commodity downward, so that thin commodity or thick commodity is automatically delivered one by one.

Other features and advantages of the present invention will become apparent from the following description taken in conjunction with the accompanying drawings.

BRIEF DESCRIPTION OF THE DRAWINGS

FIG. 17 is a side view of commodity delivering mechanism according to the second embodiment.

FIG. 18 is a front view of the commodity delivering mechanism shown in FIG. 17.

FIG. 19 illustrates a case where three thin cans S are loaded into the commodity feed mechanism in the instance of no-purchase.

FIG. 20 illustrates a case where the bottom can of the three cans S is delivered downward.

FIG. 21 illustrates a case where two thick cans R are loaded into the commodity feed mechanism in the instance of no-purchase.

FIG. 22 illustrates a case where the bottom can of two thick cans R is delivered downward.

FIGS. 23–25 show relation between each contact surfaces (88, 89, 90) and position of third latch bar 64, where in second stopper 80, there are provided neutral-position contact surface 88, activation-position pressing contact surface 89, and activation-position maintaining contact surface 90.

FIG. 23 illustrates second stopper 80 in the neutral position (mode).

FIG. 24 illustrates second stopper 80 in the activation position (mode).

FIG. 25 illustrates second stopper 80 in the no-activation position (mode).

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

FIGS. 5 through 16 show configuration for commodity delivering device in an automatic vending machine according to the first embodiment.

Figure 2:
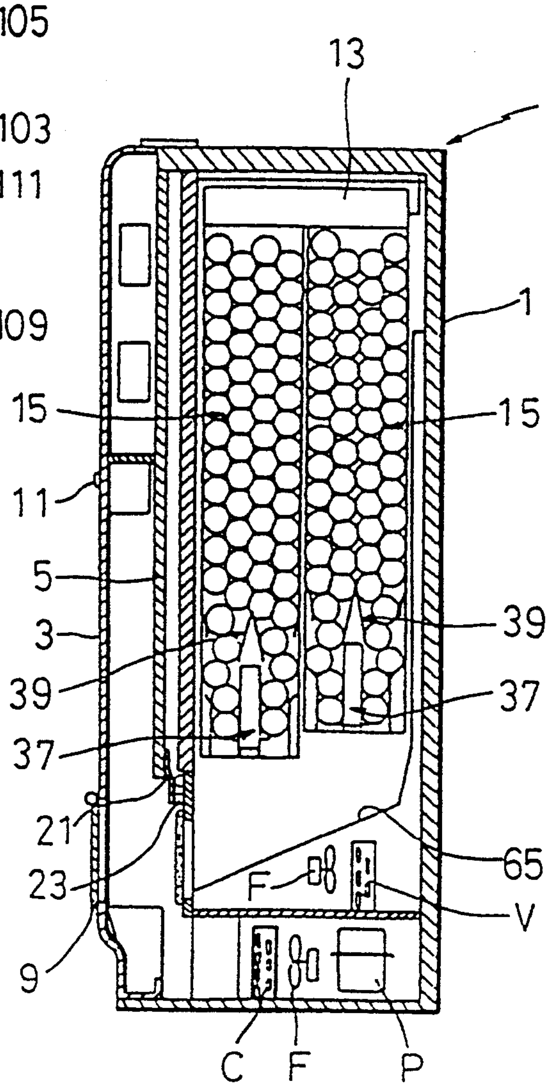
FIG. 2 shows overall configuration for the automatic vending machine.

Referring to FIG. 2 which shows overall configuration for the automatic vending machine, the reference numeral 1 denotes a main body of automatic vending machine 7 which is opened and closed by main door (open-close door) 3 and inner door 5. In a lower portion thereof, there is provided a freezer which comprises evaporator V, compressor P, capacitor C and fan F.

Main door 3 is equipped with a coin inlet (not shown) for inserting a coin thereto, delivery port 9, commodity selection buttons 11 and so on. In an upper portion of main door, commodity samples are displayed. Inner door 5 is made of insulation material so as to serve as an insulated door.

Main body 1 further incorporates therein storage racks 15 hanged from telescopic rails 13. Storage racks 15 are arranged in plural columns in a left-hand side and a right-hand side.

Figure 3:
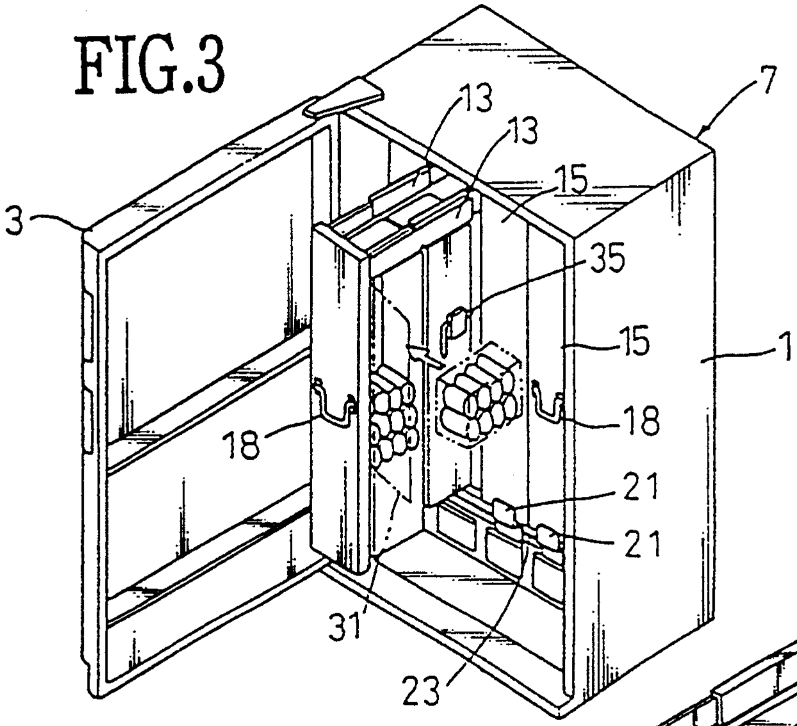
FIG. 3 is a perspective view of whole automatic vending machine.
Figure 4:
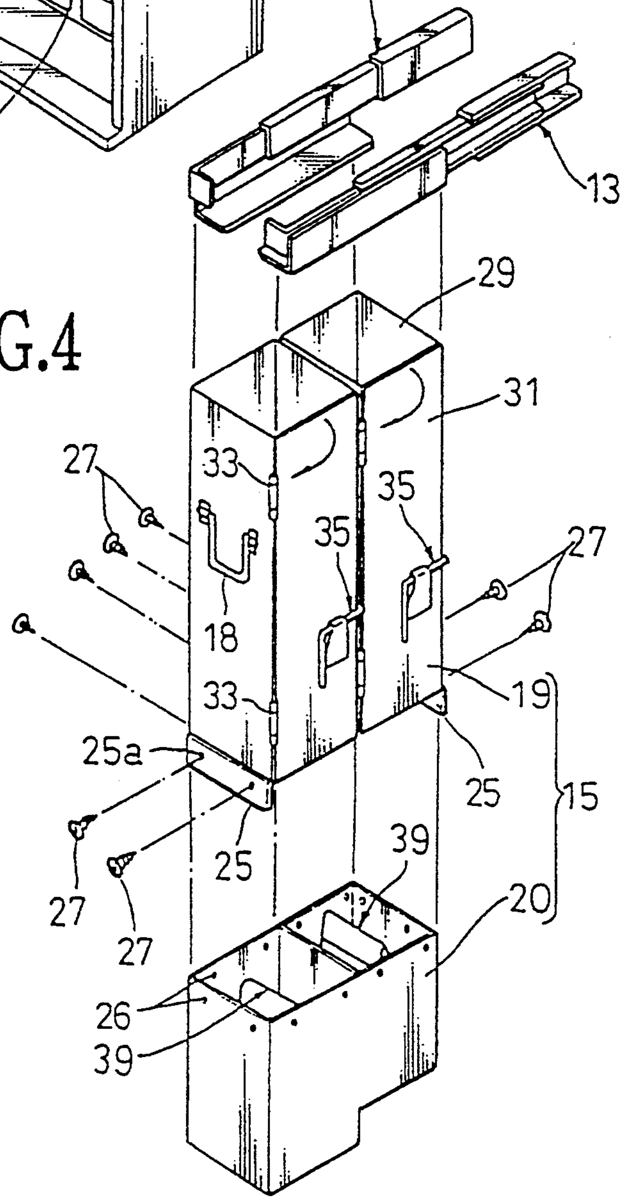
FIG. 4 shows an internal construction of the automatic vending machine.

Referring to FIG. 4, storage racks 15 comprise upper commodity storage portion 19 which is hanged from rail 13 and lower discharge portion 20, and upper commodity portion 19 and lower discharge portion 20 are separately removable. Both upper commodity portion 19 and lower discharge portion 20 can be pulled out by means of rail 13. Referring to FIG. 3, when one of upper portion 19 and lower portion 20 is pulled out along guide rail 23, other one is prevented from being pulled out by means of stopper 21 which is provided slidable along guide rail 23. Thus, both of portions 19, 20 can not be pulled out simultaneously.

Referring to FIG. 4, commodity storage portion 19 is comprised of box-shaped storage body 29 whose one side is open, and open-close door 31 which opens and closes a side thereof. A front wall of casing 29 is provided with handle 18 with which the storage rack 15 is pulled out. Commodity storage portion 19 is coupled to lower discharge portion 20 by means of screw 27 which is fitted to mounting holes 25*a* and upper end mounting hole 26 provided in commodity discharge portion 20. Mounting hole 25*a* is provided on mounting bracket 25 which is extended downwardly from a lower end of storage portion 19.

Referring still to FIG. 4, door 31 is fitted to a side of casing 29 with hinges 33 and turnable on a direction indicated with a arrow mark. Door 31 is locked or unlocked with lock lever 35. When the door is widely opened, commodities may be collectively put in or taken out of storage portion 19. The width of casing 29 of storage portion 19 is sized such that four lines of thin (small) cans or three lines of thick (big) cans are stored in casing 29.

Referring to FIG. 2, there are provided commodity delivering device 37 and guide member 39 mounted on device 37, in a center portion of commodity discharge portion 20. The cross section of guide member 39 is of triangular shape so that the commodity transferred from storage portion 19 is guided smoothly into either right or left portion thereof.

Figure 5:
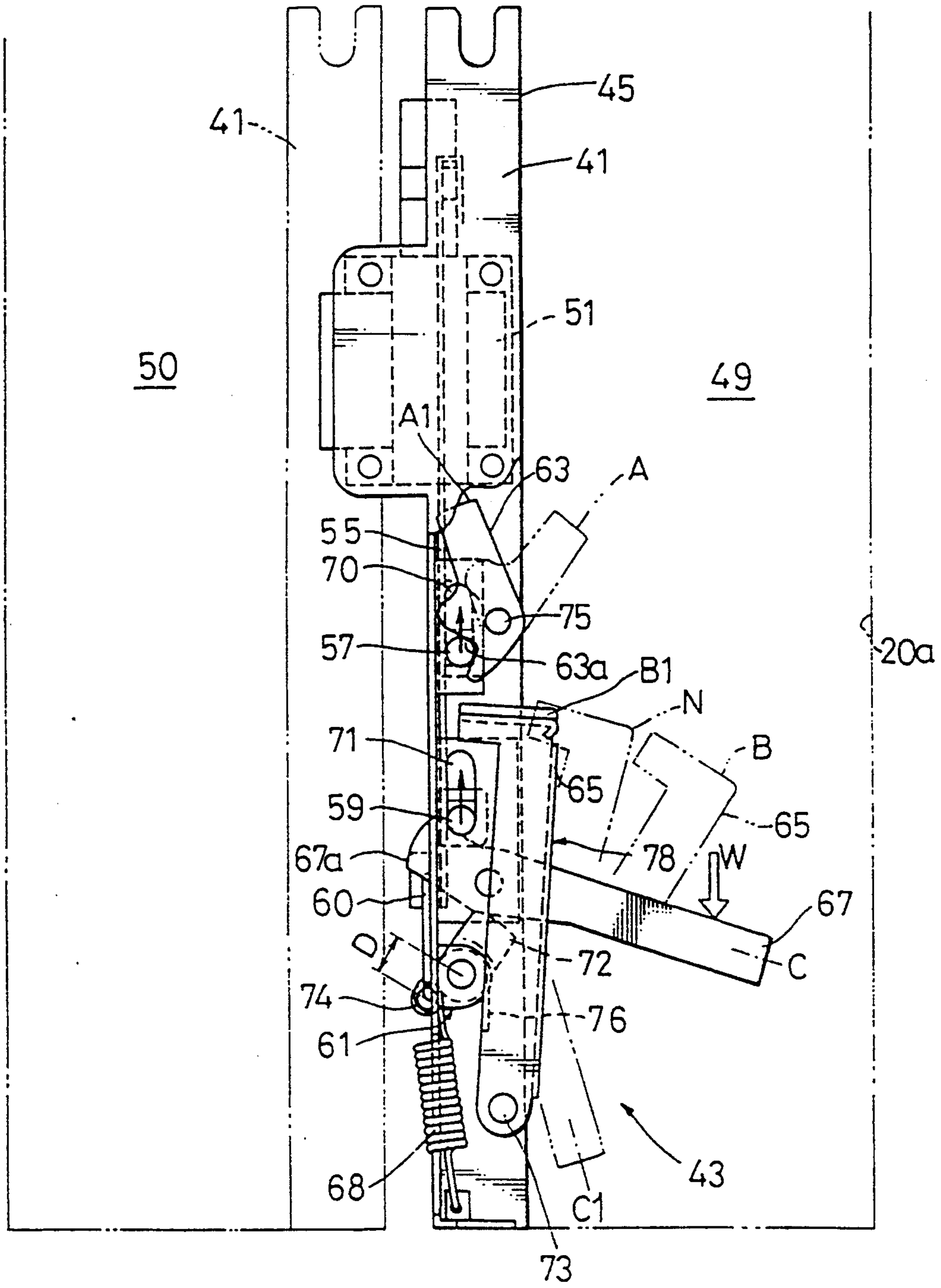
FIG. 5 is a side view of commodity delivering mechanism according to the present invention.
Figure 6:
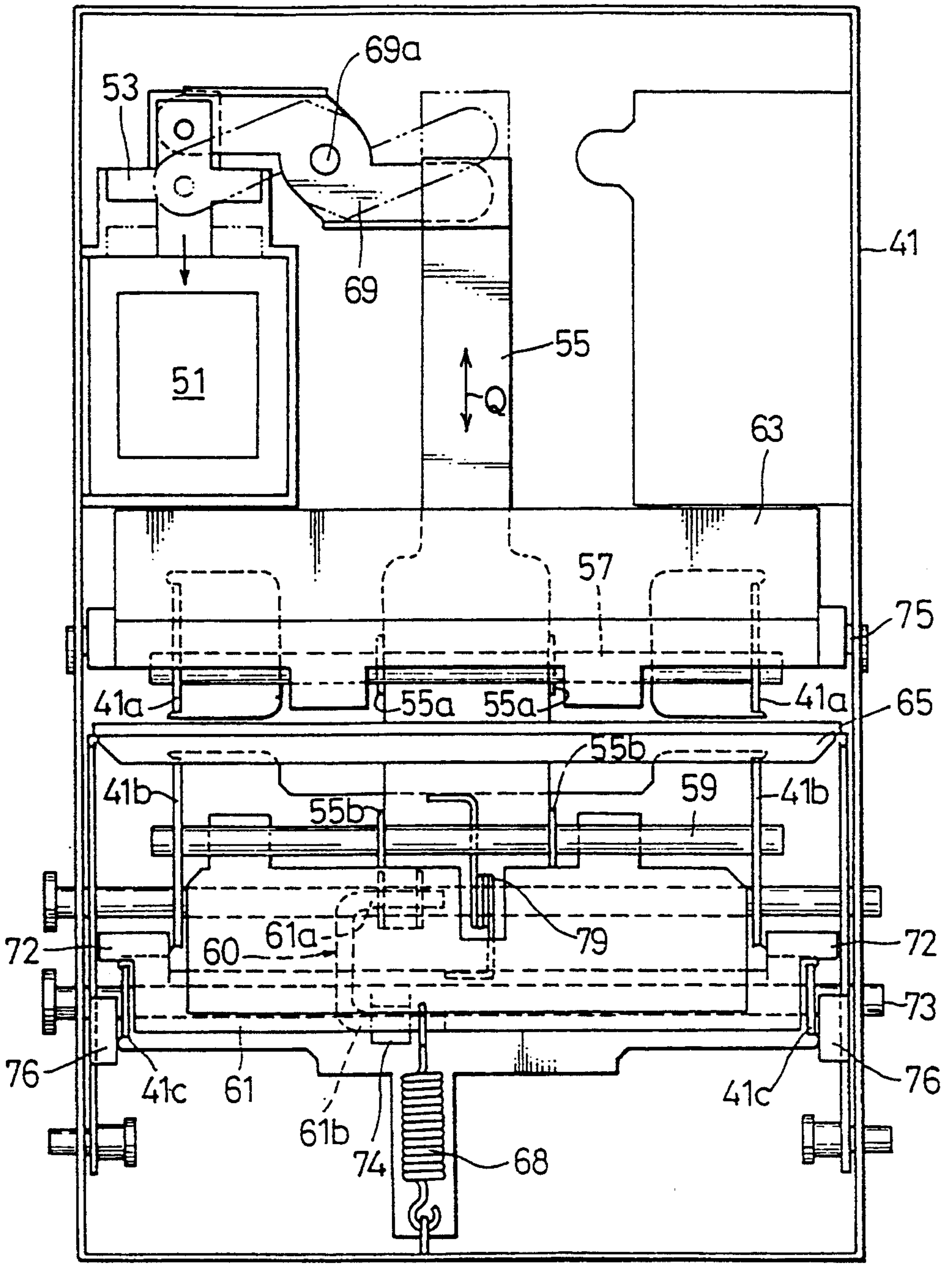
FIG. 6 is a front view of the commodity delivering mechanism shown in FIG. 5.
Figure 7:
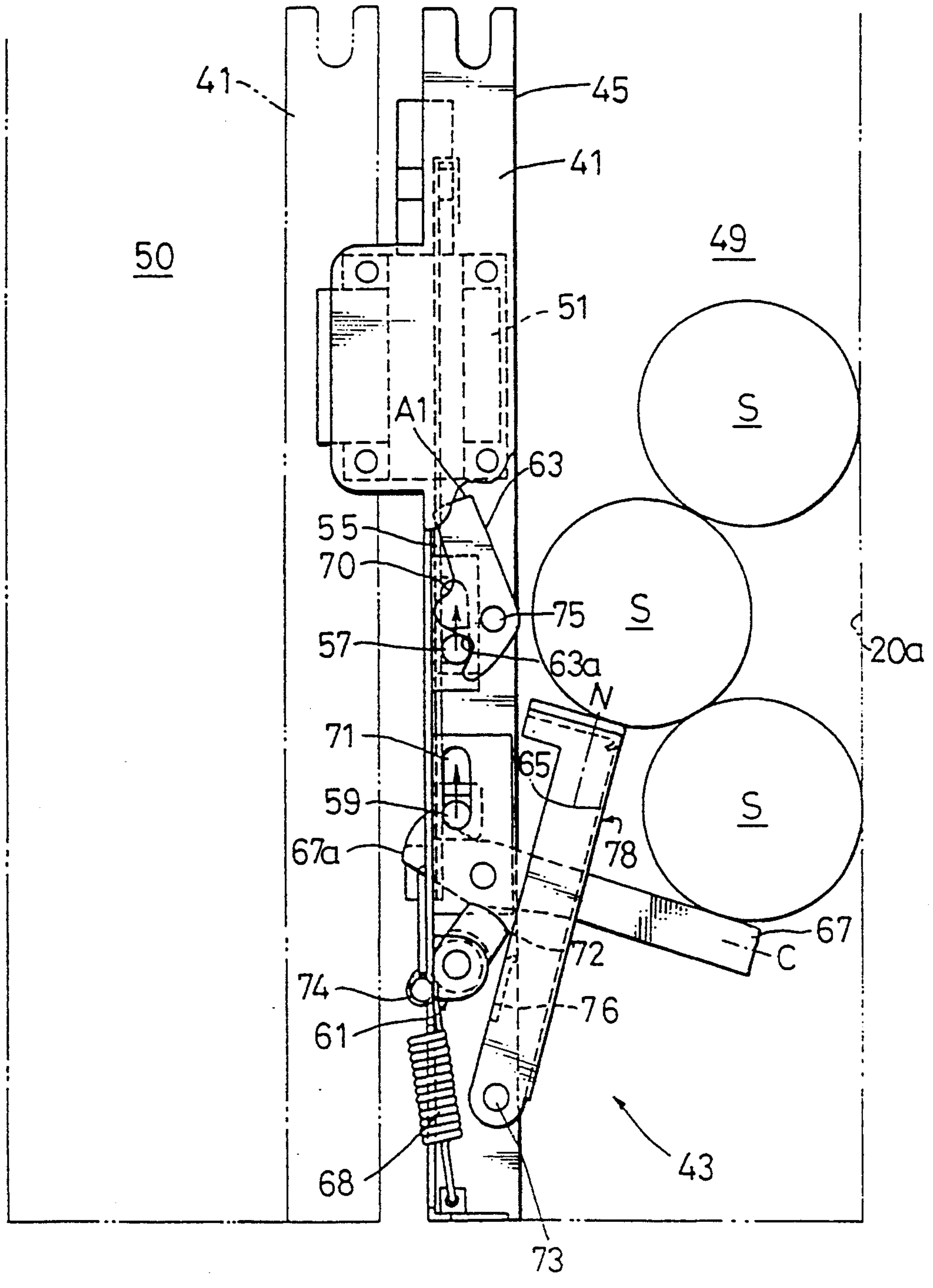
FIG. 7 illustrates a case where three thin cans S are loaded into the commodity delivering mechanism shown in FIG. 5.
Figure 8:
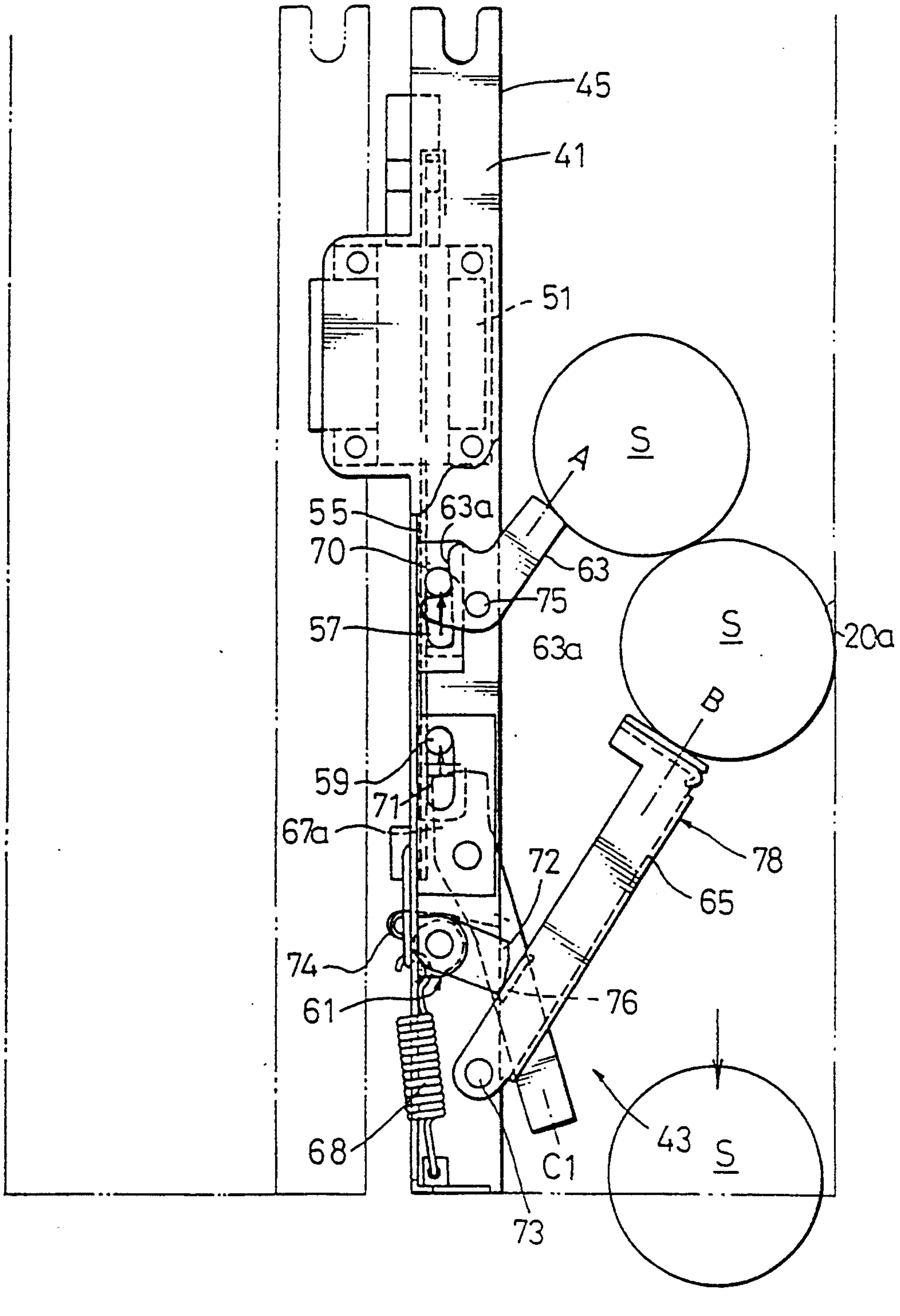
FIG. 8 illustrates positional relations of first stopper, second stopper and feed stopper where the lowest-placed can S is delivered downwardly and the can S second from the lowest-placed can S is supported by second stopper.

Referring to FIG. 5 and FIG. 6, commodity delivering device 37 comprises commodity delivering mechanism 43 and first and second commodity paths 49, 50, respectively. The first and second commodity paths 49, 50 are formed by side walls 45, 45 of body casings 41, 41 and inner wall faces 20*a*, 20*a* of commodity discharge portion 20. Side wall 45 is disposed counter to inner wall face 20*a* and there is formed a predetermined fixed width for commodity path 49 thereby.

In this specification, a right side of commodity delivering mechanism 43 will be described hereinbelow since there are formed a pair of right and left mechanisms each of which constitutes an identical mechanism.

Commodity delivering mechanism may be termed as a feed mechanism, and both terms are interchangeably used in this specification.

Commodity delivering mechanism 43 comprises on-off switchable solenoid 51, plunger 53 movable in and out of solenoid 51 in response to ON and OFF actions of solenoid 51, center slider 55 that moves up and down in response to movement of plunger 53, upper latch bar 57 and lower latch bar 59 that are directly mounted to center slider 55, and latch cam 61 attached to center slider 55 through coupling member 60.

Feed mechanism 43 further includes a first stopper 63, a second stopper 65 and feed stopper 67 whose operations are controlled by upper latch bar 57, lower latch bar 59 and latch cam 61.

When a coin is inserted into the coin inlet (not shown) of main door 3 and then one of commodity selection buttons 11 is pressed, solenoid 51 is turned ON. Upon a next signal, a left-side solenoid (not shown) is turned ON. The right and left solenoids are alternately turned ON in response to activation signals. When solenoid 51 is turned ON, plunger 53 is attracted in a direction indicated with an arrow mark. Plunger 53 is pulled up by a magnet as a result of energization thereof for approximately 0.25 seconds. Solenoid 51 is turned OFF after a predetermined time.

When solenoid 51 is turned ON, plunger 53 is pulled in a direction indicated with an arrow mark; when solenoid is turned OFF, plunger 53 is pulled back to an original position by a return spring 68 through center slider 55. An end of the return spring 68 is connected to the bottom of body casing 41, while the other end thereof is connected to an end of coupling member 60.

Center slider 55 is forced downward by return spring 68. Center slider 55 is interlocked and coupled to plunger 53 via crank-shaped activation arm 69 which is swingable around arm shaft 69*a*, so that center slider can move up and down (directions indicated with Q in FIG. 6) in response to the movement of plunger 53.

Upper latch bar 57 that is formed in lateral rod shape is supported by first mounting members 55*a*, 55*a* that are provided approximately in the center of center slider 55. Both ends of upper latch bar 57 are placed within long holes 70 along first tongue members 41*a*, 41*a* and are movable in vertical directions within a range occupied by hole 70. The tongue member is cut out from plate material (such as metal) and bent substantially orthogonal to the plate material.

Lower latch bar 59 that is formed in lateral rod shape is supported by first mounting members 55*a*, 55*a* that are provided approximately in tile center of center slider 55. Both ends of lower latch bar 59 are placed within long holes 71 along second tongue members 41*b*, 41*b* and are movable in vertical directions within a range occupied by hole 71.

Referring still to FIG. 5 and FIG. 6, latch cam body 61 has a projected cam portion 72 and is freely rotatably attached against main shaft 73 whose both ends are supported by third member 41*c*.

Latch cam body 61 is interlocked with center slider 55 via coupling member 60 so that cam portion 72 rotates in response to vertical movement of center slider 55. Coupling member 60 is bent in the shape of a sideways "U" in which a horizontal end 61*a* thereof is fixed to center slider 55 and other horizontal end 61*b* thereof is fixed to arm portion 74 extended from latch cam body 61. Thereby, distance D (see FIG. 5) between a fixed portion and a rotation axis center of latch cam body 61 is obtained. In other words, a function point is secured, so that cam portion 72 can rotate clockwise or couterclockwise around the rotation shaft center.

First stopper 63 is disposed above second stopper 65, and first stopper 63 serves to be utilized for thick cans R. First stopper is normally disposed in the position indicated with A1 in FIG. 5 and is disposed in the close vicinity of upper latch bar 57. First stopper 68 has a protruded contact surface 68*a*. When upper latch bar 57 comes in contact with contact surface 68*a* where upper latch bar 57 is in a rising position (the arrow mark shown in FIG. 5), first stopper 63 is moved into an activation state indicated with a projected position as A in FIG. 5. In other words, first stopper 63 is rotated around stopper shaft 75 whose both ends are supported by body casing 41 so that first stopper 63 is in a position indicated with A projected into commodity passage 49. When first latch bar 57 descends from an up position, it presses against contact surface 63*a* so that it presents no-activation mode A1 which is retreated from commodity passage 49. Namely, first stopper 63 is freely switchable for activation mode A and no-activation mode A1 by interlocking with vertical movements of upper latch bar 57.

Length and dimension of first stopper 63 is set such that thin commodity S can pass through commodity passage 49 and thick commodity R is supported thereby when first stopper 63 is in the activation state. Thin commodity S is one whose radius is less than that of thick commodity.

Second stopper 65 is for use with the thin commodity S. Contact surface 76 is provided in a position corresponding to cam portion 72 of latch cam body 61. Second stopper 76 is normally in a neutral position indicated with N (in FIG. 5) by spring 77 shown in FIG. 16.

Figure 14:
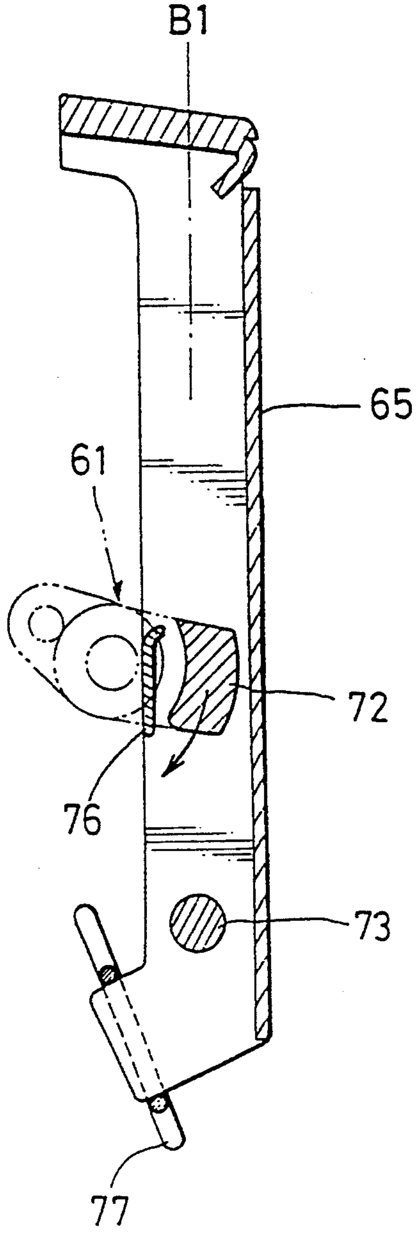
Figure 15:
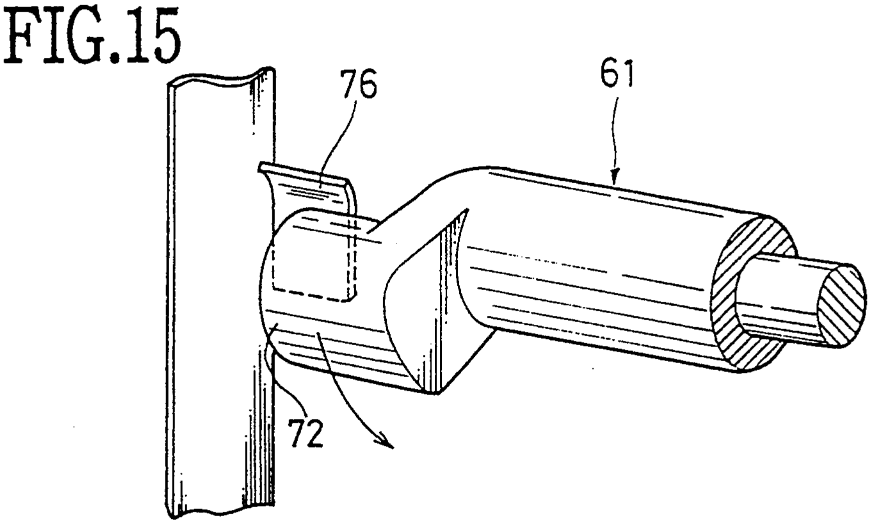
FIG. 15 shows a perspective view of FIG. 14 where cam portion 72 of latch cam body 61 is in no contact with contact surface 76.

FIG. 15 shows a perspective view of FIG. 14 where cam portion 72 of latch cam body 61 is in no contact with contact surface 76.

Figure 16:
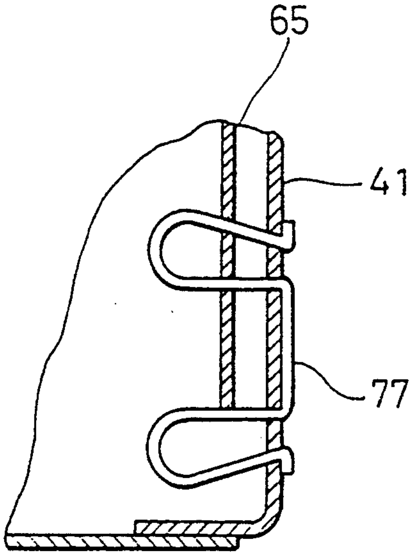
FIG. 16 shows how second stopper is provided vis-a-vis spring 77.

FIG. 16 shows how second stopper is provided vis-a-vis spring 77.

Figure 9:
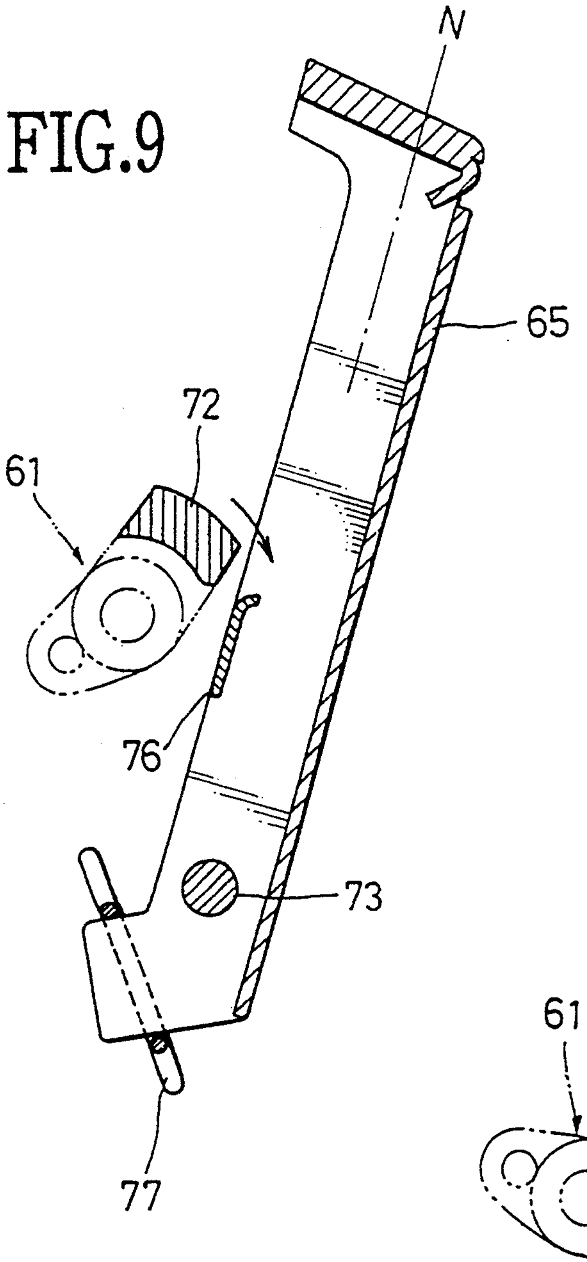
FIG. 9 illustrates relationship between latch cam body 61 and second stopper 65.
Figure 10:
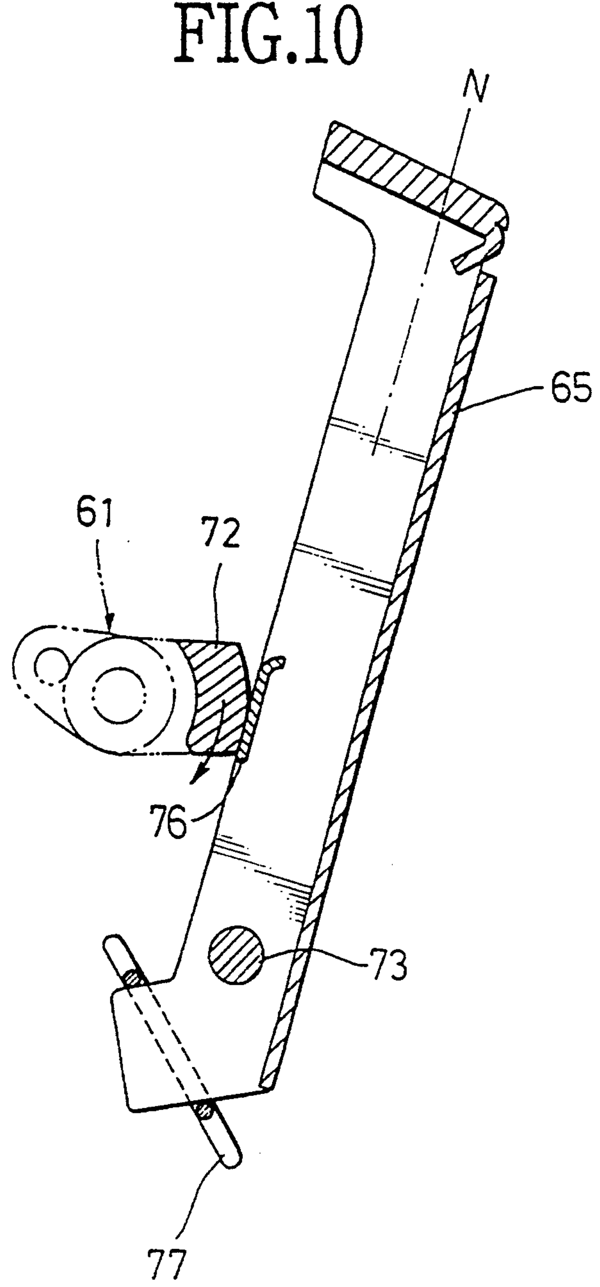
FIG. 10 illustrates an operation of second stopper 65.

Referring to FIG. 5, second stopper 65 can be switched to activation position B which is in a projected position to commodity passage 49, from the neutral position N. When second stopper 65 is pressed against thick can R, second stopper 65 is in no-activation position B1 retreated from the neutral position N. Referring to FIG. 9 and FIG. 10, when contact surface 76 is pressed by rotation of cam portion 72 of latch cain body 61, the second stopper 65 is switched from the neutral position N to activation position B where second stopper is projected into commodity passage 49.

Distance of projection of second stopper from the no-activation position is set such that the thin commodity S in commodity passage 49 can be supported thereby when second stopper is in the activation position B.

For example, thick commodity R is one having a diameter ranging from Φ66 through Φ68, whereas thick commodity S is Φ49 through Φ53.

Contact surface 76 of second stopper 65 is set such that it lies on an operating locus line where the rotation of cam portion 72 of latch cam body 61 is pressed thereagainst in the neutral position N.

Figure 13:
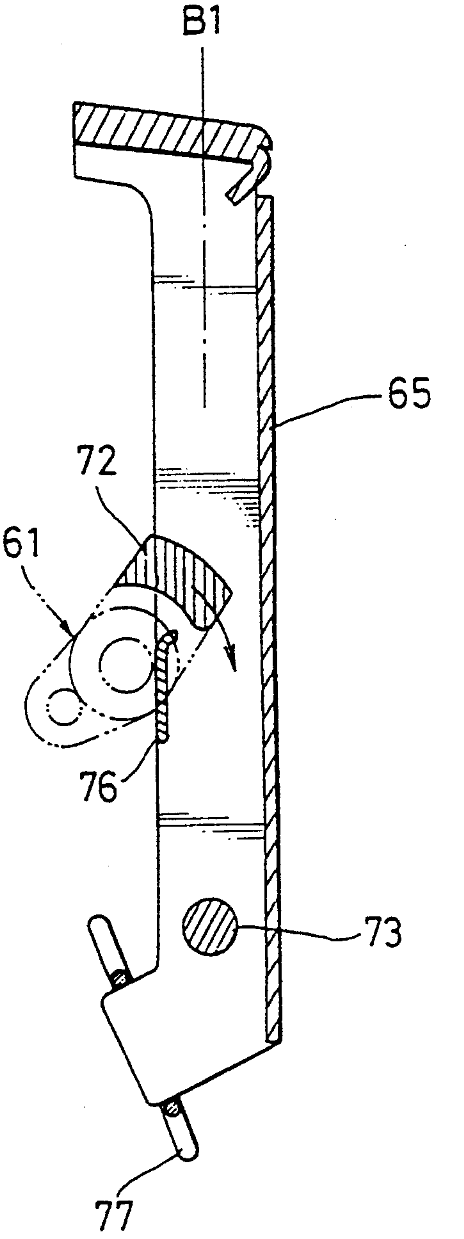
FIG. 13 and FIG. 14 show second stopper 65 in which cam portion 72 of latch cam body 61 is rotated and second stopper 65 is in the no-activation position.

Referring to FIG. 13 and FIG. 14, when second stopper 65 is in no-activation position B1, cam portion 72 is not pressed and not engaged with contact surface 76 even though cam portion 72 of latch cam body 61 is rotated. In other words, cam portion 72 does not press contact surface 76 and pass through it so that contact surface 76 is set to outside of the operating locus line.

When second stopper 65 is in the neutral position N, second stopper 65 is pressed by thick can R and moves into no-activation position (mode) B1. Second stopper 65 remains at no-activation position B1 even when cam portion 72 of latch cam body 61 is operated. Therefore, in accordance with the thin can and thick can, the second stopper 65 can be switched to activation position B and no-activation position B1, respectively. Accordingly, the second stopper 65 serves also as commodity detecting means 78.

Feed stopper 67 is mounted so that it can be freely switchable either for feed position C1 or supporting position C by means of lower latch bar 59 whose both ends are supported by tongue member 41*b*. With reference to FIG. 6, feed stopper 67 is normally positioned at supporting position C by energization spring 79 in counterclockwise direction.

Base end portion 67*a* of feed stopper 67 is extended outwardly from low, latch bar 59 and is in contact with lower latch bar 59 so that clockwise motion is restricted. Thereby, even though a load W is acted upon feed stopper 67, the clockwise motion toward feed position C1 is prevented, so that the supporting position C is secured.

Therefore, when lower latch bar 59 is lifted up, feed stopper 67 is released from the supporting position, and then the position of feed stopper 67 is switched to feed position C1 from supporting position C.

Hereinbelow, operation for the commodity feed device according to the present invention will be described in detail.

First of all, referring to FIG. 4 and FIG. 5, for example, when commodity storage portion 19 is empty, first stopper 63 is in the no-activation position A1, second stopper 65 is in the neutral position N, and the feed stopper 67 is in the supporting position C.

Under such a circumstance, thin cans S whose diameter are comparatively small are loaded into commodity storage portion 19. Then, referring to FIG. 7, a lowest-placed can S is supported by feed stopper 67, and this is a standby state.

In this instance of no-purchase, when solenoid 51 is activated by the signal from commodity selection button 11 and plunger 53 is pulled, upper latch bar 57 and lower latch bar 59 are moved to the up position and latch cam body 61 rotates. Then, with reference to FIG. 8, the second can S from the lowest-placed can S is temporarily supported by second stopper 65 pressed by cam portion 72. Simultaneously, feed stopper 67 is released to present feed position C1 accompanied by lifting of lower latch bar 59, so that the commodity is delivered downward. During this operation, first stopper 63 is placed in activation position A. However, since passage width for the thin can S to pass through is secured then, the thin can S can be transferred with no problem.

After completion off feed operation, feed stopper 67 is restored to the supporting position C, and upper latch bar 57 and lower latch bar 59 are dropped, whereas second stopper 65 is returned to the original neutral position N so that the commodity is dropped onto feed stopper 67 which is the supporting position C. Above operations are repeated so that the commodity such as thin can S is well taken care of.

Figure 11:
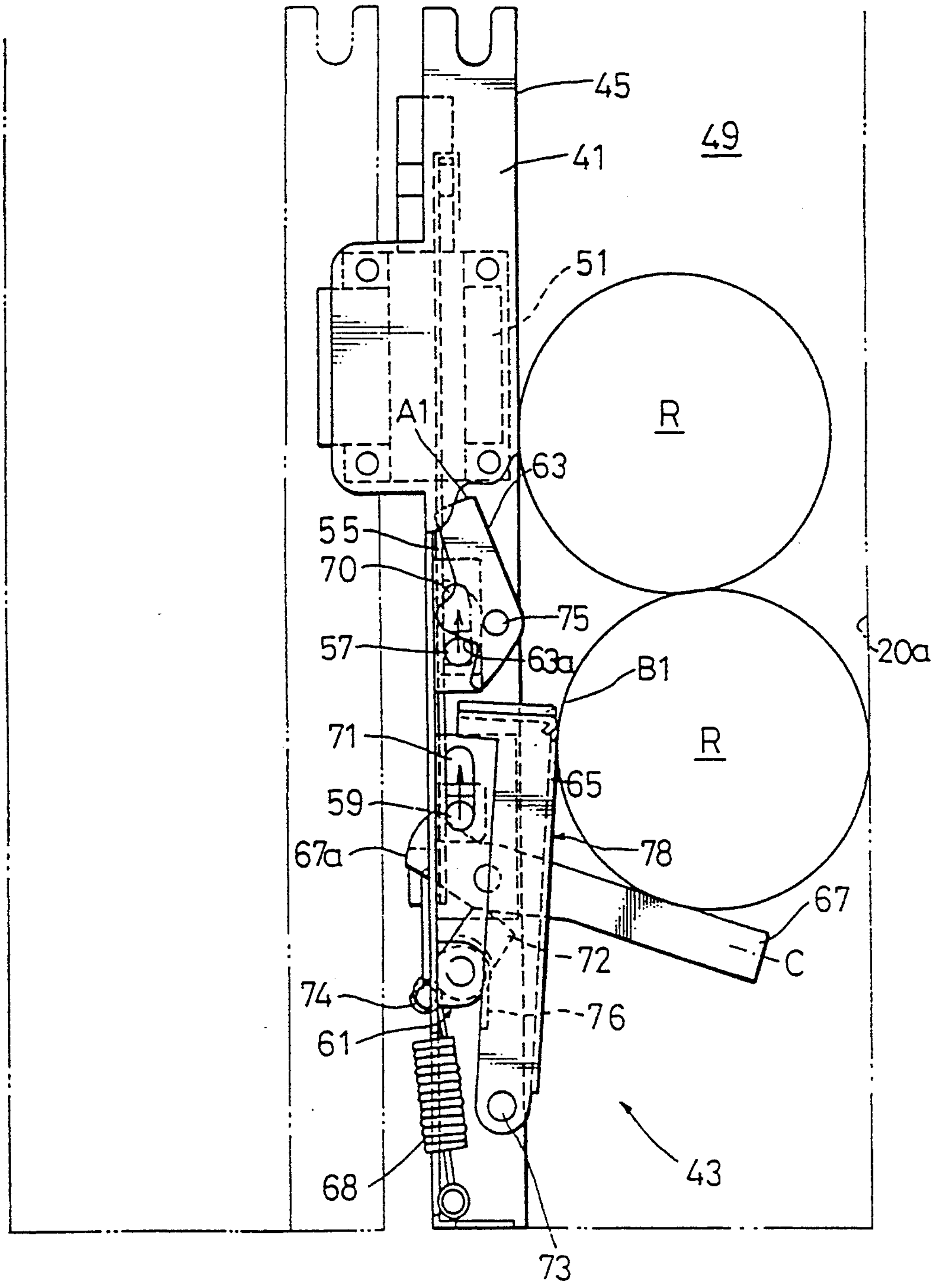
FIG. 11 illustrates a case where two thick cans R are loaded into the commodity delivering mechanism at the time of no-purchase.

Next, as for relatively big-size commodity such as thick can R whose diameter is greater than that of commodity S, referring to FIG. 11, the lowest-placed commodity is supported by feed stopper 67, in the instance of no purchase by a customer. Then, second stopper 65 is pressed against the lowest-placed commodity R and is in the no-activation position B1.

Figure 12:
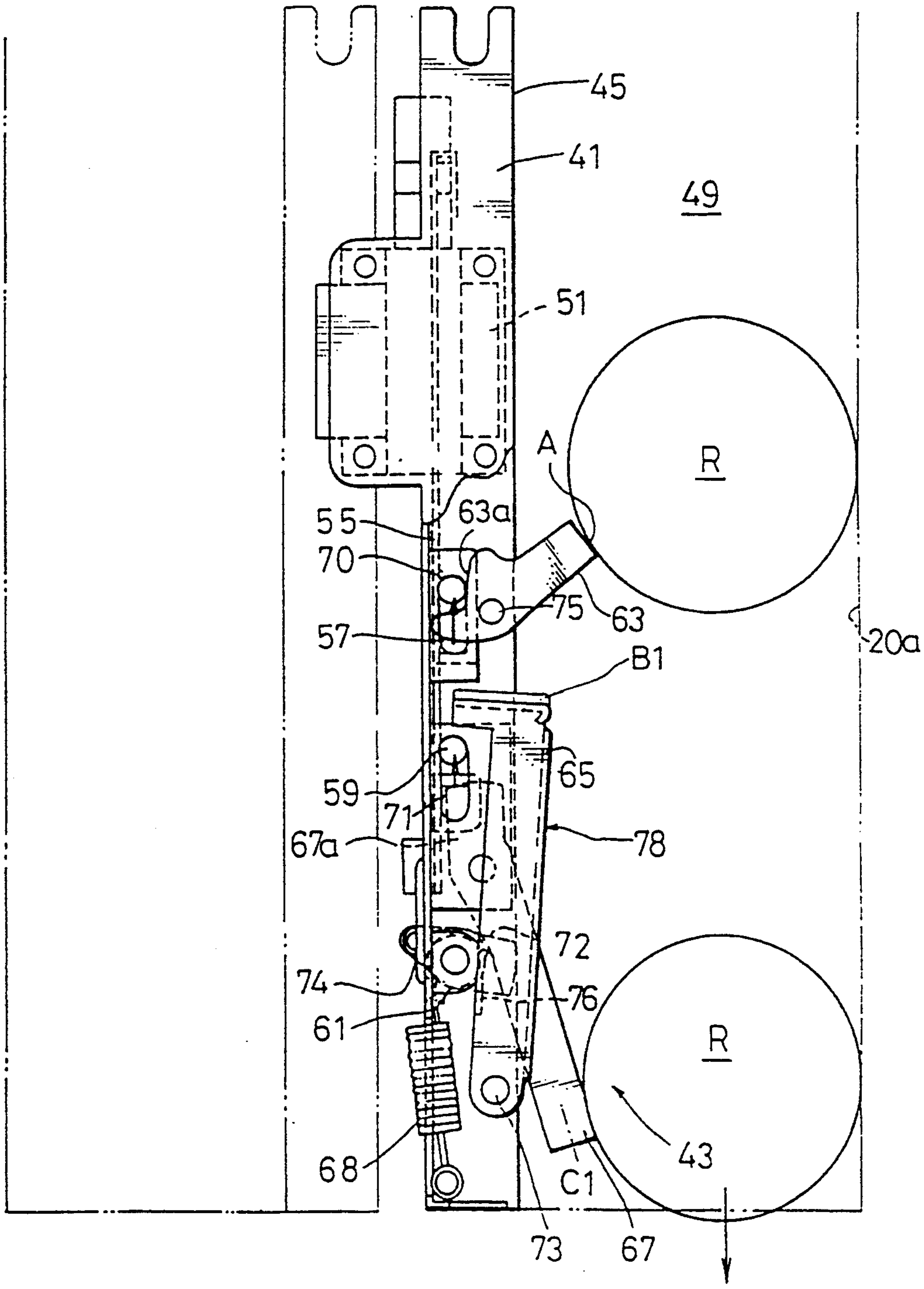
FIG. 12 illustrates positional relations of first stopper, second stopper and feed stopper where the lowest-placed can R is delivered downwardly and the can R second from the lowest-placed can R is supported by first stopper.

In this instance of no-purchase, when solenoid 51 is activated by the signal from commodity selection button 11 so as to attract plunger 53, upper latch bar 57 and lower latch bar 59 are moved to the up position and latch cam body 61 rotates. Then, with reference to FIG. 12, cam body 72 does not come in contact with contact surface 76, so that the second stopper 65 remains at the no-activation position B1. Referring still to FIG. 12, the second lowest-placed commodity R is temporarily supported by first stopper which is switched to the activation position A by means of upper latch bar 57. Simultaneously, feed stopper 67 is released to present feed position C1 accompanied by lifting of lower latch bar 59, so that the commodity is delivered downward.

After completion of feed operation, feed stopper 67 is restored to the supporting position C, upper latch bar 57 and lower latch bar 59 are dropped, whereas first stopper 63 is returned to the no-activation position A1 so that the commodity is dropped onto feed stopper 67 which is the supporting position C. Above operations are repeated so that the commodity such as thick can R is well taken care of.

Figure 1:
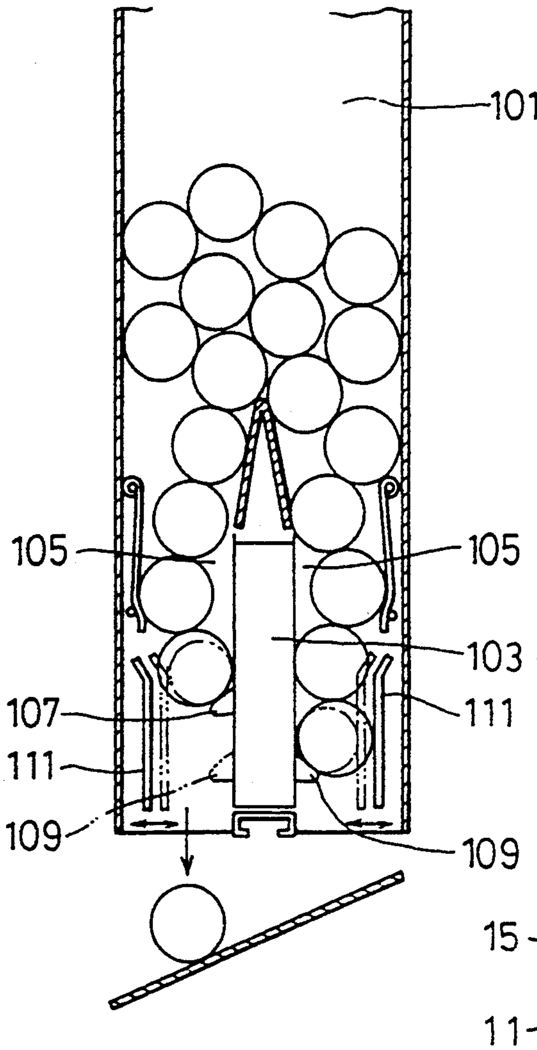
FIG.1 PRIOR ART
FIG. 1 shows a commodity delivering device and commodity paths according to the conventional automatic vending machine.

In the above-realized operation for the commodity feed device for the automatic vending machine, it is to be noted that significance for the novel structure lies in that there is no need to adjust the commodity passage width. Thus, such work consumed by adjustment is totally eliminated. Moreover, by employing the present invention, guide plates 111 (see FIG. 1) are no longer necessitated, so that the vending machine can be further down-sized.

FIGS. 17–25 show another commodity feed mechanism 43 for the automatic vending machine according to the second embodiment of the present invention.

Figure 17:
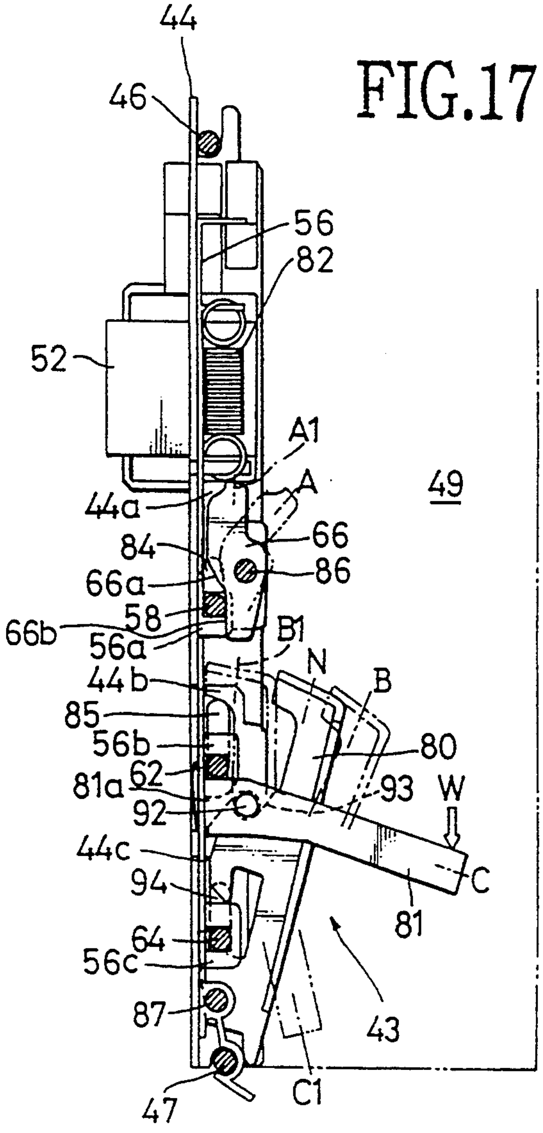
FIGS. 17–25 show another commodity feed mechanism 43 for the automatic vending machine according to the second embodiment of the present invention.

Referring to FIG. 17, commodity feed mechanism or commodity delivering mechanism 43 are provided as a pair such that body casings 44 thereof are mounted by upper mount shaft 46 and lower mount shaft 47. In this specification, a right side of commodity delivering mechanism 43 will be described hereinbelow since there are formed the pair of right and left mechanisms each of which constitutes an identical mechanism.

Commodity delivering mechanism may be termed as a feed mechanism, and both terms are interchangeably used in this specification.

Commodity delivering mechanism 43 comprises on-off switchable solenoid 52, plunger 54 movable in and out of solenoid 52 in response to ON and OFF actions of solenoid 52, center slider 56 that moves up and down in response to movement of plunger 54, and first latch bar 58, second latch bar 62, third latch bar 64 that are directly mounted to center slider.

In the feed mechanism 43, there are also provided first and second stoppers 66, 80 and feed stopper 81 that are activated by first latch bar 58, second latch bar 62 and third latch bar 64.

Figure 18:
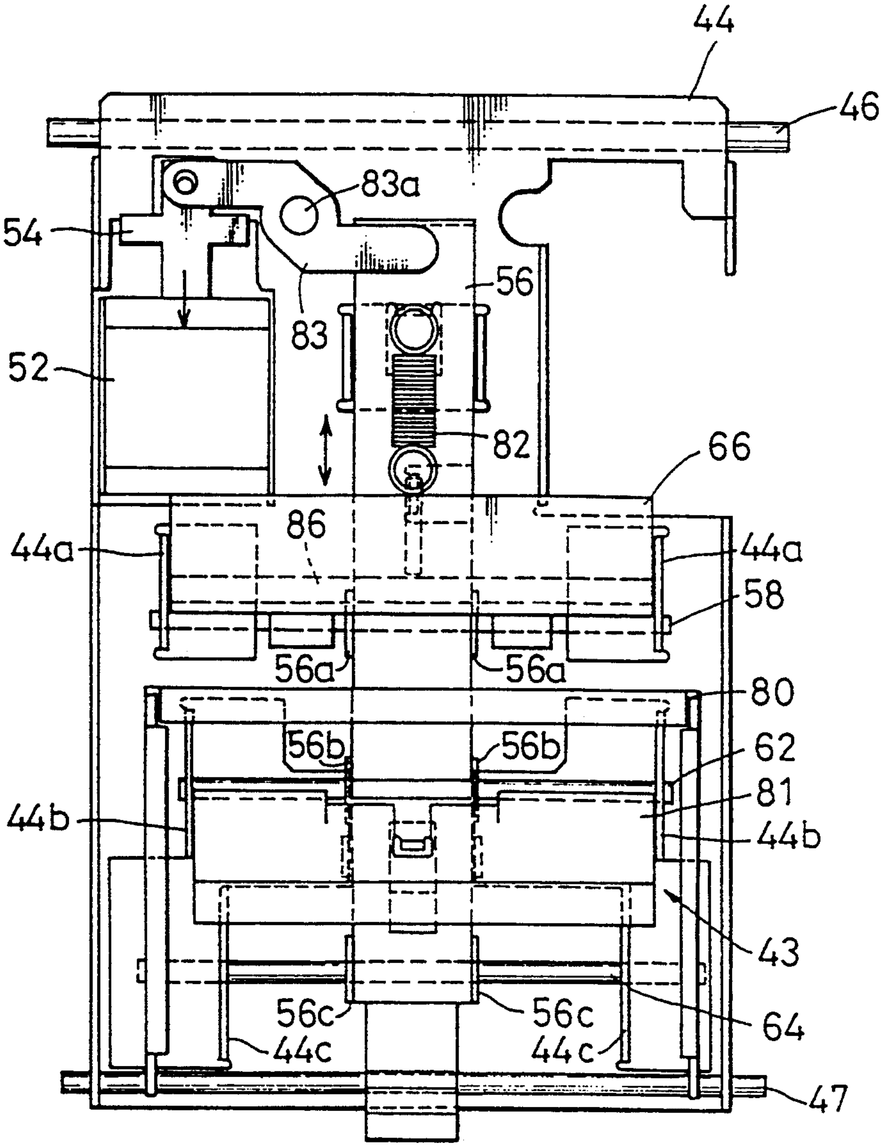

When a coin is inserted into the coin inlet (not shown) of main door 3 and then one of commodity selection buttons 11 is depressed, solenoid is turned ON. Upon a next signal, a left-side solenoid (not shown) is turned ON. Referring to FIG. 18, the right and left solenoids are alternately turned ON in response to activation signals. When solenoid 52 is turned ON, plunger 54 is attracted in a direction indicated with an arrow mark. Solenoid 52 is turned OFF after a prescribed time lapse.

When solenoid 52 is turned ON, plunger 54 is pulled in a direction indicated with an arrow mark; when solenoid is turned OFF, plunger 54 is pulled back to an original position by a return spring 82 through center slider 56. An end of return spring 82 is connected to the bottom side of body casing 44, while the other end thereof is connected to a side of center slider 56.

Referring to FIG. 18, center slider 56 is constantly forced downwardly by return spring 82. Center slider 56 is interlocked with plunger 54 through crank-shaped activation arm 83 which is swingable around arm shaft 83a, so that center slider 56 can move in vertical directions responsive to the movement of plunger 54.

First latch bar 58 that is formed in lateral rod shape is supported by first mount members 56a, 56a that are provided approximately in the center of center slider 56. Both ends of first latch bar 58 are placed within long holes 84 along first tongue members 44a, 44a and are movable in vertical directions within a range occupied by hole 84.

Second latch bar 62 that is formed in lateral rod shape is supported by second mount members 56b, 56b that are provided approximately in the center of center slider 56. Both ends of second latch bar 62 are placed within long holes 85 along second tongue members 44b, 44b and are movable in vertical directions within a range occupied by hole 85.

Third latch bar 64 that is formed in lateral rod shape is supported by third mount members 56c, 56c that are provided approximately in the center of center slider 56. Both ends of third latch bar 64 are placed within long holes 94 along third tongue members 44c, 44c and are movable in vertical directions within a range occupied by hole 94.

Referring to FIG. 17, first stopper 66 is disposed above second stopper 80 and first stopper 66 serves to be for use with thick cans R. First stopper 66 is normally disposed in a counter-clockwise position indicated with A1 in FIG. 17 and is disposed in the close vicinity of first latch bar. First stopper 66 has a protruded contact surface 66a disposed counter to first latch bar 58. When first latch bar 58 in a rising state it comes in contact with contact surface 66a, first stopper is pressed upwardly so as to present an activation mode indicated with a projected position A in commodity passage 49, in FIG. 17. In other words, first stopper 68 is rotated around stopper shaft 86 whose both ends are supported by body casing 44 so that first stopper 66 is in the position indicated with A projected into commodity passage 49. When first latch bar 58 descends from the up position, it presses against contact surface 66b so that it presents no-activation mode A1 which is retreated from commodity passage 49. Namely, first stopper 66 is freely switchable for activation mode A and no-activation mode A1 by interlocking with vertical movements of first latch bar 58.

Length and dimension of first stopper 66 is set such that thin commodity S can pass through commodity passage 49 and thick commodity R is supported thereby when first stopper 66 is in the activation mode A.

Second stopper 80 is for use with the thin commodity S. Second stopper 80 is rotatable around stopper shaft 87 so that it can be switched for each mode of neutral position N, activation position B and no-activation mode B1. In other words, second stopper 80 can be freely switched to activation B or no-activation mode from neutral position.

Figure 23:
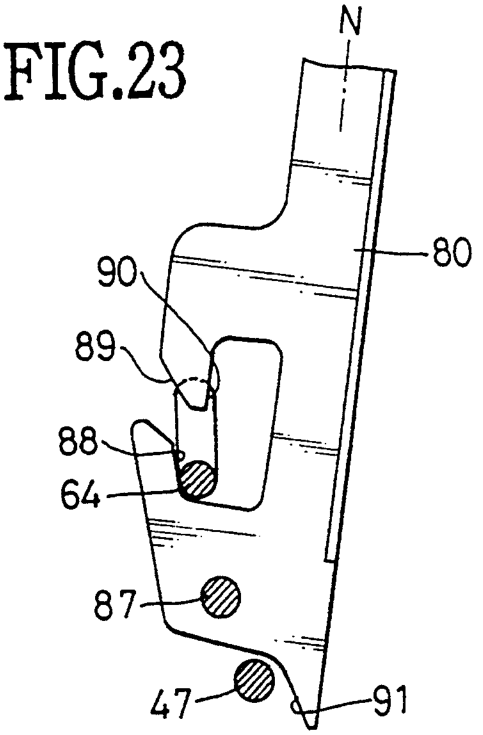
Figure 24:
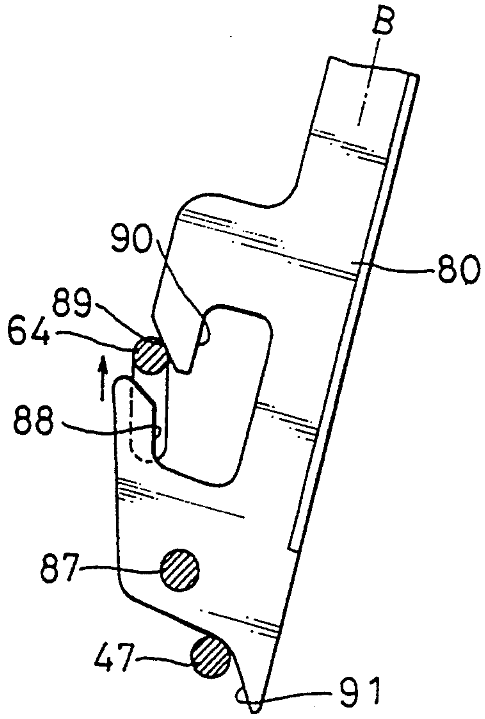
Figure 25:
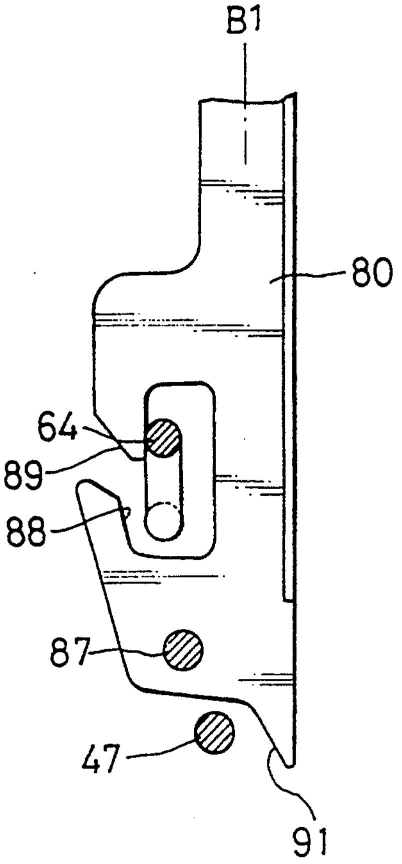

Referring to FIG. 23, FIG. 24 and FIG. 25, in second stopper 80, there are provided neutral-position contact surface 88, activation-position pressing contact surface 89, and no-activation-position maintaining contact surface 90.

FIGS. 23–25 show relation between each contact surfaces (88, 89, 90) and position of third latch bar 64.

Stopper axis 87 is provided in a dislocated position from gravity center of second stopper 80. Thus, second stopper is supported in a stopping position in clockwise direction by self weight of second stopper 80, neutral-position contact surface 88 is in contact with third latch bar 64 so that second stopper is in its position at a neutral position N.

Third latch bar 64 in contact with neutral-position contact surface 88 rises up so as to press activation-position pressing contact surface 89. As a result thereof, stopper surface 91 comes in contact with mount shaft 47. Thereby, activation position (mode) B for second stopper 80 is thus obtained as shown in FIG. 24.

When second stopper 80 at normal neutral position (mode) N is pressed by thick can R, second stopper 80 is position to no-activation mode B1 as shown in FIG. 25.

Length and dimension of second stopper 80 is set such that thin commodity S is supported by second stopper at activation mode B.

Feed stopper 81 is mounted so that it can be switchable either for feed position (mode) C1 or supporting position (mode) C by means of stopper shaft 92 whose both ends are supported by second tongue member 44b. Feed stopper 81 is normally positioned at supporting mode C by energization spring in counter-clockwise direction.

Base end portion 81a of feed stopper 81 is extended outwardly from stopper shaft 92 and is in contact with second latch bar 62 so that clockwise motion is restricted. Thereby, even though a load W is acted upon feed stopper 81, the clockwise motion toward feed position C1 is prohibited, so that the supporting position C is obtained.

Therefore, when second latch bar 62 is lifted up, feed stopper 81 is released from the supporting mode and then the position of feed stopper 81 is switched to feed position C1 from supporting position C.

Hereinbelow, operation and function for the commodity feed device according to the second embodiment will be described in detail.

First of all, when commodity storage portion 19 is empty, first stopper 66 is in the no-activation position A1, second stopper 80 is in the neutral position N, and the feed stopper 80 is in the supporting position C.

Figure 19:
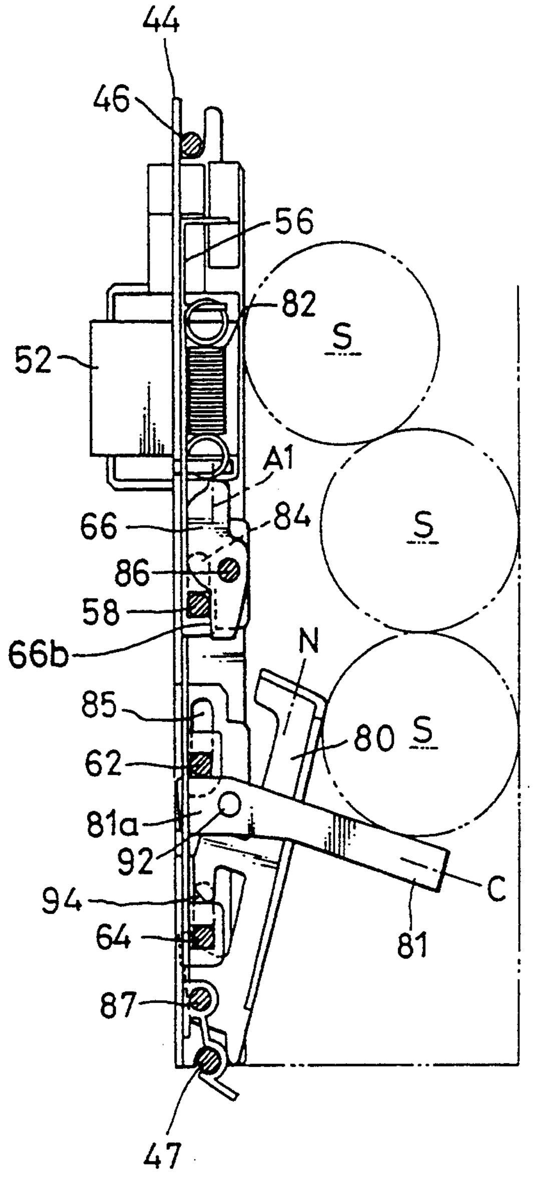

Under above condition, thin cans S whose diameters are comparatively small are loaded into commodity storage portion 19. Referring to FIG. 19, then, the lowest-placed can S is supported by feed stopper 81, and a standby state is obtained.

Figure 20:
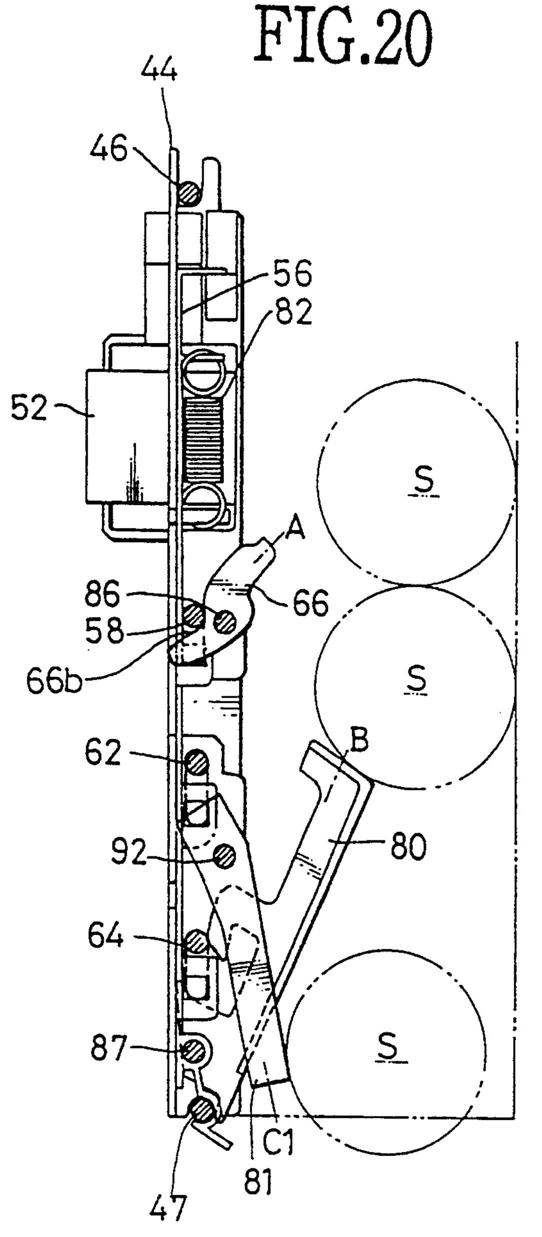

In this instance of no-purchase, when solenoid 51 is activated by the signal from commodity selection button 11 and plunger 54 is pulled, first, second and third latch bars 58, 62, 64 are moved to the up position. Referring to FIG. 20, the can S second from the lowest-placed can S is temporarily supported by action in which activation-position pressing contact surface 89 is pressed by third latch bar 64. Simultaneously, feed stopper 81 is released to present feed position of C1 accompanied by lifting of second latch bar 62, so that the commodity is delivered downward. During this operation, first stopper 66 is placed in activation position A. However, since passage width for the thin can S to pass therethrough is secured then, the thin can S can be transferred with no problem.

After completion of feed operation, feed stopper 81 is restored to the supporting position C, and first latch bar 58 and second latch bar 62 are dropped, whereas second stopper 80 is returned to the original neutral position N so that the commodity is dropped onto feed stopper 81 which is in the supporting position C. Above cycle of operations are repeatedly performed so that the commodity such as thin can S is smoothly transferred.

Figure 21:
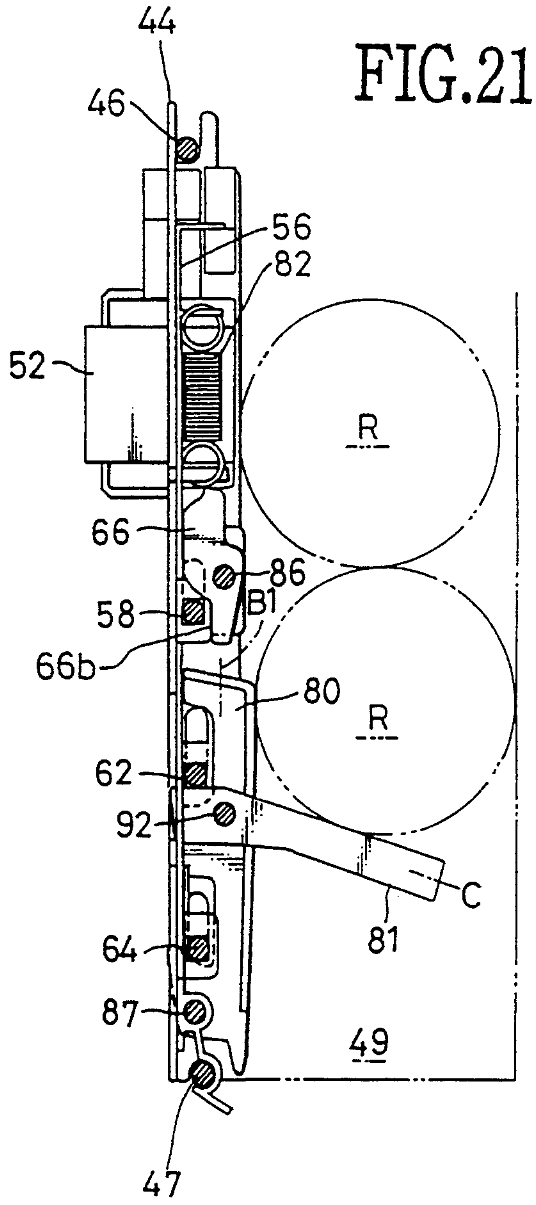

Next, as for relatively big-size commodity such as thick can R whose diameter is greater than that of thin commodity S, referring to FIG. 21, the lowest-placed commodity is supported by feed stopper 81, in the instance of no purchase by a customer. Then, second stopper 80 is pressed against the lowest-placed commodity R and is in the no-activation position B1.

Figure 22:
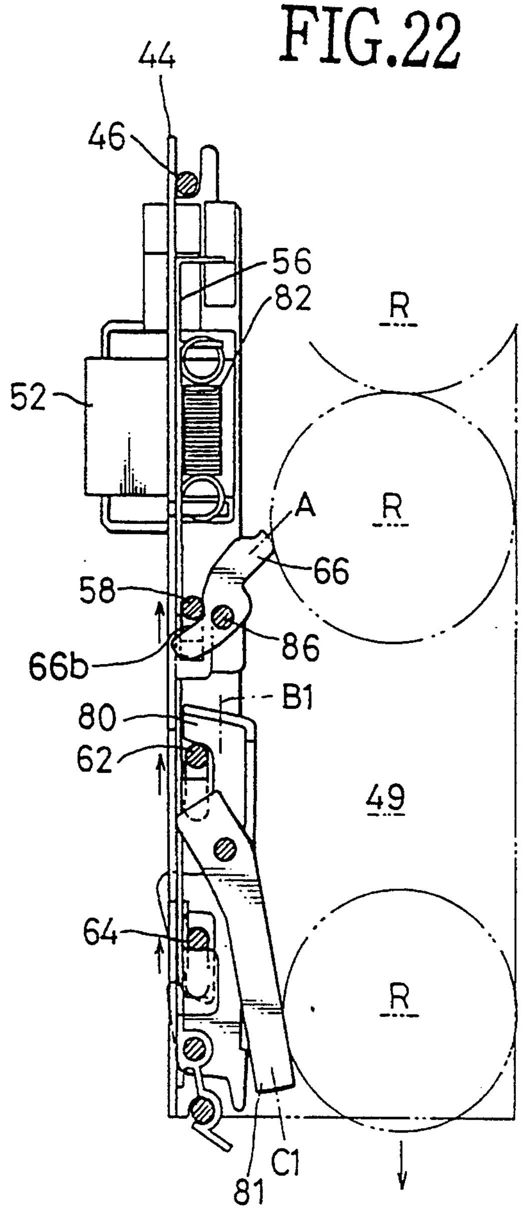

In this instance of no-purchase, when solenoid 51 is activated by the signal from commodity selection button 11 so as to attract plunger 54, first, second and third latch bars 58, 62, 64 are moved to the up position. Then, with reference to FIG. 25, third latch bar 64 comes in contact with no-activation-position contact surface 90 so that second stopper 80 is in the no-activation position B1. On the other hand, as for first stopper 66 which is switched to activation position A due to first latch bar 58, first stopper 66 temporarily supports the commodity R second from the lowest-placed commodity as shown in FIG. 22. Simultaneously, feed stopper 81 is released to present feed position C1 accompanied by lifting of second latch bar 62, so that the commodity is delivered downward.

After completion of feed operation, feed stopper 81 is restored to the supporting position C. Then first, second and third latch bars 58, 62, 64 are dropped, whereas first stopper 66 is returned to the no-activation position A1 so that the commodity is dropped onto feed stopper 81 which is in the supporting position C. Above operations are repeated so that the commodity such as thick can R is smoothly transferred.

In the above cycled operation for the commodity feed device for the automatic vending machine, it is to be noted that significance for the novel structure lies in that there is no need to adjust the commodity passage width. Thus, such work consumed by adjustment is totally eliminated. Moreover, by employing the present invention, guide plates 111 (see FIG. 1) are no longer necessitated, so that the vending machine can be further down-sized. More importantly, by employing the second embodiment, configuration and construction for second stopper 80 as well as second latch bar 62 is further simplified by adopting contact surfaces 88, 89, 90.

Figure 26A:
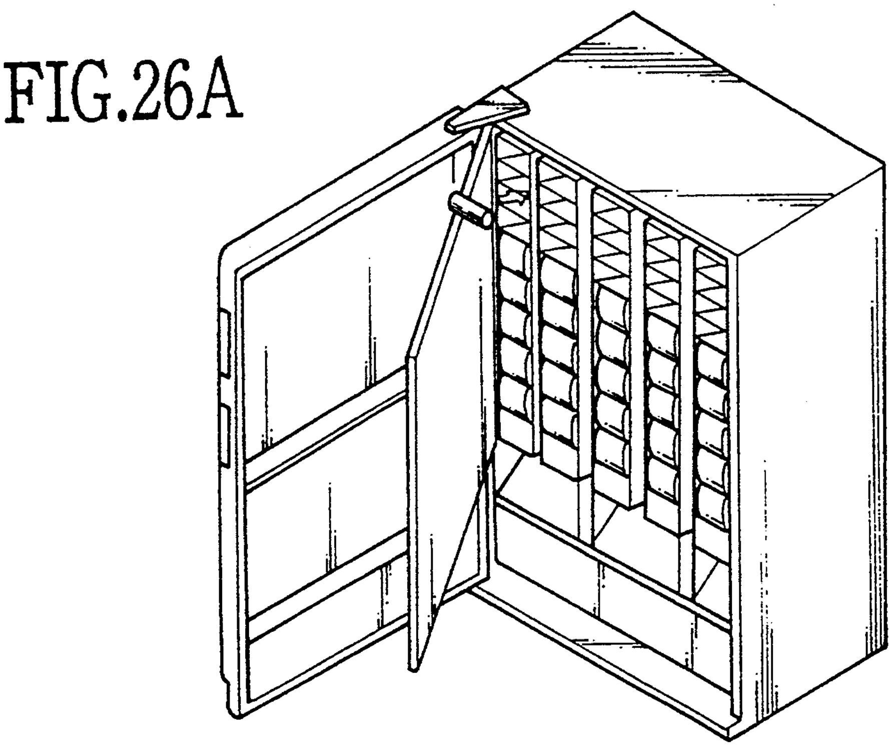
FIG. 26*a* is a perspective view of whole automatic vending machine used for stocking many types of commodities.
Figure 26B:
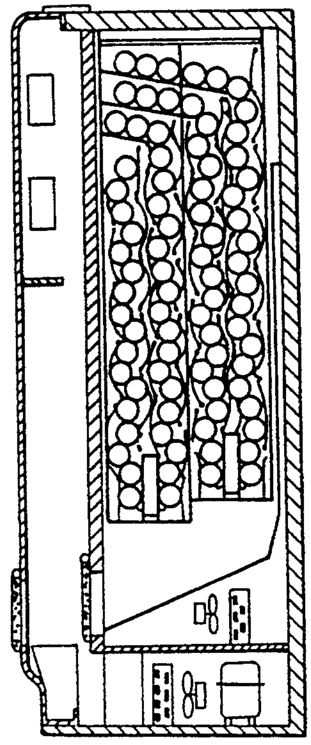
FIG. 26B shows overall configuration and cross-sectional view cut vertically for the automatic vending machine shown in 26A, viewed from a side thereof.

Though, in the above embodiment, the specific description is primarily directed to a case for the automatic vending machine where same type of cans are massively stocked therein, the feed mechanism according to the present invention may be adopted to the automatic vending machine where many types of cans are stocked therein, as shown in FIGS. 26A and 26B. In the large-volume stock type appratus as have been shown in FIG. 2, there are two discharge openings, so that the commodities are alternately discharged; this alternate discharge also serves to prevent the commodities from being clogged. On the contrary, in the many-types stocking type apparatus shown in FIG. 26B, there is no need to perform such an alternate discharge mechanism.

The present invention may be extended to usage of automatically sorting out more than two different-size commodity based on the above novel configuration primarily prepared for sorting out thick and thin commodities.

In summary, by employing the present invention, there is caused no need to adjust the commodity passage. Therefore, in case of loading anew thin cans from thick cans or vice versa, work necessary therefor is significantly made easy and simple. Moreover, guide plates that have been necessary to differentiate size of commodity is no longer necessitated, so that the overall dimension for the automatic vending machine is made compact and down-sized.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An automatic vending apparatus for use with two different-size commodities in which a commodity feed mechanism thereof comprises:

first stopper means for freely switching between an activation position and a no-activation position, the activation position thereof being projected into a commodity passage so as to support a thick commodity and the no-activation position being retreated from the commodity passage;

second stopper means, disposed right under the first stopper means, for freely switching between an activation position and a no-activation position; and feed stopper means for switching between an activation position interlocked with the first or second stopper means so as to thereon support the commodity, and a feed position for transferring the commodity downward, so that thin commodity or thick commodity is automatically delivered one by one.

2. The automatic vending apparatus of claim 1, wherein the commodity feed mechanism is configured such that width of the commodity passage is set so that the width is less than a diameter of the thick commodity and is greater than a diameter of the thin commodity in the event that the first stopper means is in the activation position.

3. The automatic vending apparatus of claim 1, wherein the feed stopper means includes means for detecting and distinguishing size of the commodities based on whether or not the second stopper means is in the activation position.

4. The automatic vending apparatus of claim 3, wherein the feed stopper means is set to its activation position, the first stopper means is set to its activation position and the second stopper means is set to its no-activation position in the event that the detecting means detects the thick commodity, whereas the feed stopper means is set to its activation position and the second stopper means is set to its activation position in the event that the detecting means detects the thin commodity.

* * * * *